INVENTORS
HORACE ALLAN WILKINSON
ERIC PAUL DIMMOCK

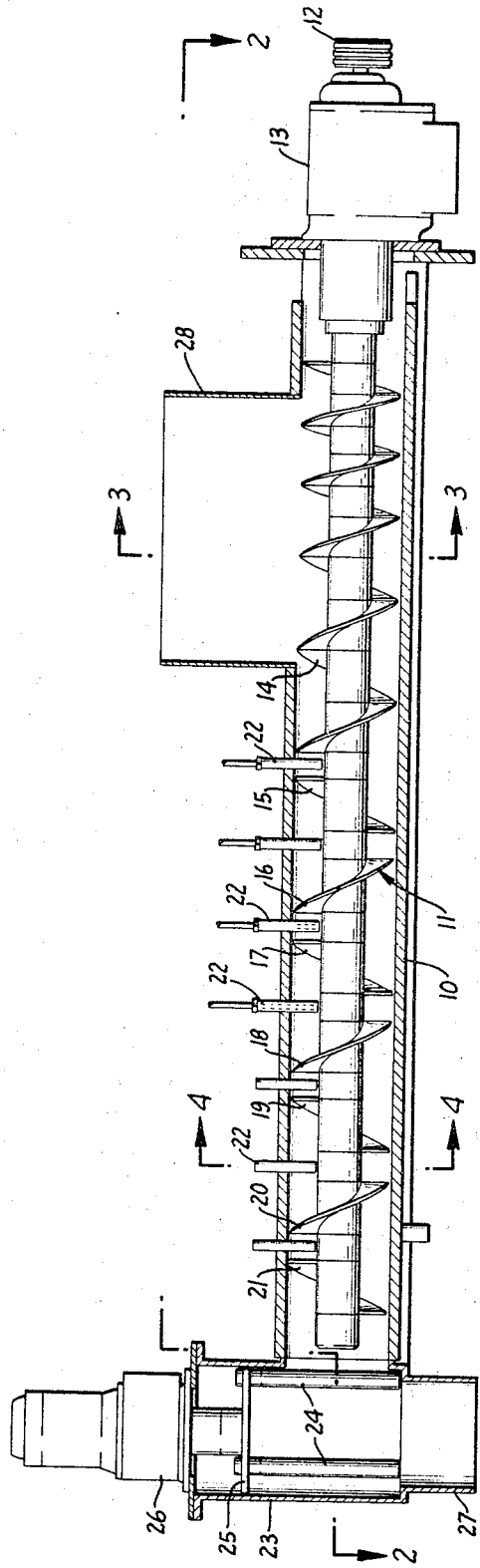
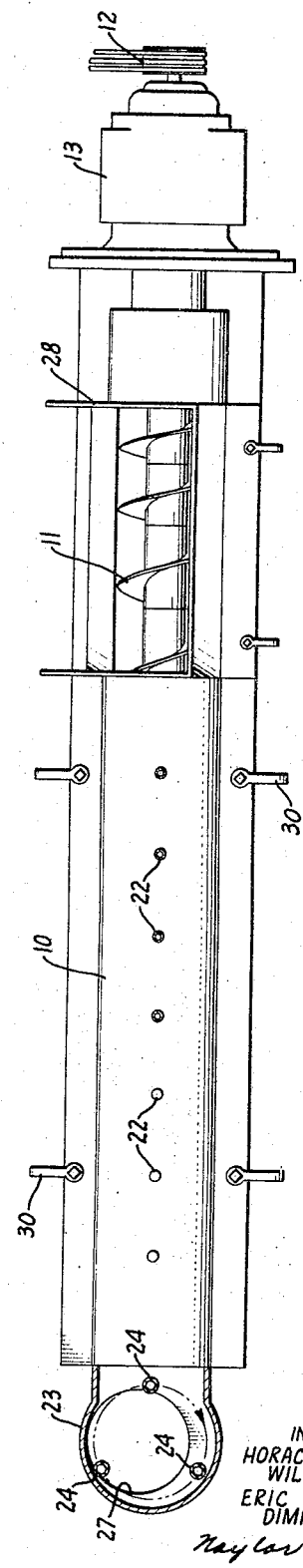

Naylor & Neal
ATTORNEYS

United States Patent Office 3,348,820
Patented Oct. 24, 1967

3,348,820
TUBE MIXER FOR MORTAR
Horace A. Wilkinson, Lilli Pilli, near Sydney, New South Wales, and Eric P. Dimmock, Baulkham Hills, near Sydney, New South Wales, Australia, assignors to Monier Research & Development Pty. Ltd. (formerly Monier Mechanical Research Pty. Ltd.), Sydney, New South Wales, Australia
Filed Sept. 8, 1966, Ser. No. 578,040
Claims priority, application Australia, Oct. 20, 1965, 65,496/65
7 Claims. (Cl. 259—161)

ABSTRACT OF THE DISCLOSURE

A mixer for mortar and the like comprising a tubular housing having longitudinally spaced feeding and outlet openings, and a screw flight coaxially disposed within the housing to effect the conveyance of material therethrough. The screw flight is interrupted by cylindrical spacers interposed therein at longitudinally spaced locations to permit the accumulation of plugs of material therearound. In operation, material conveyed through the housing by rotation of the screw flight is continuously trowelled into and sheared from the trailing and leading ends of the plugs formed around each of said spacers by the portions of the screw flight, respectively, immediately upstream and downstream thereof.

---

This invention relates generally to an apparatus for continuously mixing pulverulent and granular material such as cement mortar and, more particularly, to a tube type mixer for cement rich mortar.

The overall mixer of the invention comprises, in general: an extended tubular casing which houses a rotatable screw having a flight which is periodically interrupted so as to be divided into longitudinally spaced sections; means for continuously feeding dry mortar materials to the upstream portion of the flight sections; a plurality of static pins extending radially through the wall of the casing with their distal ends in close proximity to the hub of the rotatable screw at each interruption of its flight; means for feeding liquid to the interior of the casing; a final mixing chamber at the outlet end of the tubular casing; and, a relatively high speed beater disposed in the final mixing chamber from which the mixed mortar is continuously discharged for use.

Basically, the object of the invention is to provide a tube type mixer which houses a feed screw having a periodically interrupted flight whereby a plug of mortar mix is formed at each flight interruption and fresh batch material is trowelled by a preceding flight section onto the trailing end of the plug so that an equivalent quantity of batch material is sheared from the leading end of the plug by a succeeding flight section of the screw and fed by such succeeding flight section to form another plug at the next interruption of the screw flight section where the above sequence of plug formation, trowelling and shearing is repeated.

This and other objects and advantages of the present invention will become apparent in the following description and accompanying drawings, wherein:

FIG. 1 is a sectional side elevation view of one embodiment of the invention;

FIG. 2 is a plan view of the embodiment of FIG. 1 taken along the plane designated by line 2—2 of FIG. 1;

Figure 3:
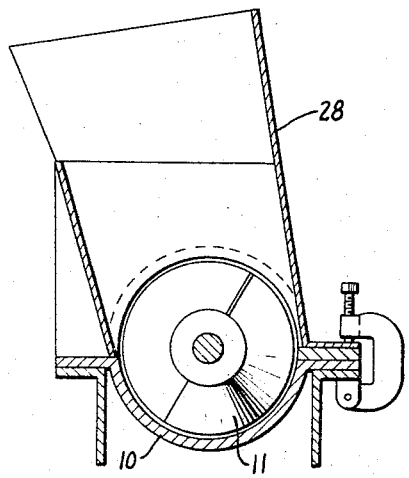
FIG. 3 is a cross-sectional view taken along the plane designated by line 3—3 of FIG. 1.
Figure 4:
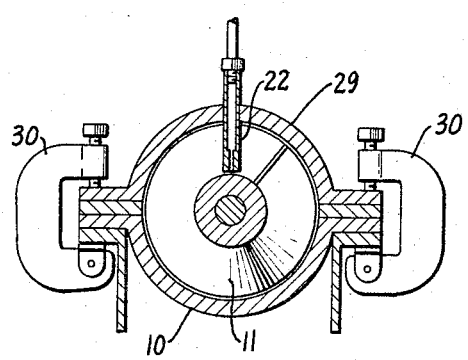
FIG. 4 is a cross-sectional view taken along the plane designated by line 4—4 of FIG. 1.

Referring now with greater detail to the embodiment of the invention illustrated in FIGS. 1 through 5, the mixer therein comprises: a horizontally supported tube 10 having therein a screw 11 driven by a V-belt system 12 through a gear box 13. The gear box 13 is provided with a thrust bearing (not shown) for preventing thrust from the screw being transferred through the gears therein. The screw 11, as can be seen from sectional views 3 and 4, is comprised of a shaft having a helical screw flight fixed thereto and extending radially therefrom.

The flight of the screw 11 is divided into longitudinally spaced flight sections 14 through 21 separated by generally cylindrical spacers. In the space between each two adjacent flight sections, a static pin 22 extends radially inwards through the wall of the tube 10. The distal ends of each of the pins 22 extend into close proximity to the hub defined by the spacers of the screw 11 at each of the interruptions. Preferably, the pitch of the screw 11 progressively increases from its input end to its output or delivery end. The output end of the screw 11 feeds to a final mixing chamber 23 which is vertically disposed and interiorly provided with a plurality of vertically arranged beaters 24 depending from a head plate 25 driven at a relatively high speed by a motor 26. The beaters, as can be seen from FIG. 2, travel in an annular path in close proximity to the interior surface of the chamber 23. An eccentrically disposed outlet 27, of less cross-sectional area than the chamber 23, is provided in the bottom thereof.

A feed hopper 28 for dry mortar materials is provided on the tube 10, near the inlet end thereof. Water, with or without dissolved additives, is added to the dry materials fed to the mixer through selective ones of the static pins 22. For the latter purpose, the pins 22 are tubular and connected to suitable sources of water (not illustrated).

In use, dry mortar materials are fed to the interior of the tube 10 through the hopper 28 at the location of the first flight section 14. The section 14, by virtue of its rotation, commences mixing and simultaneous advancement of the dry materials (e.g., sand and cement) to the second flight section 15. During this advancement of the dry materials, initial water is added thereto through the first static pin 22 while the material is passing through the space between the first flight section 14 and the second flight section 15 as the screw 11 rotates. Additional water and/or dissolved additives, may be introduced to the materials through one or more of the next succeeding static pins 22.

Each of the static pins 22 constitutes a fixed obstruction around which the materials being mixed must deviate. Through this action the pins assist in the mixing of the materials (see FIG. 5). The general mixing procedure involves the formation of a plug of mortar material in the space between each adjacent pair of flight sections 14–15, 15–16, 16–17, 17–18, 18–19, 19–20, 20–21 of the screw 11, each plug of mortar material, in turn, being advanced by mortar material trowelled onto its trailing end by the next preceding flight section of the screw 11 so that the leading end of each plug is progressively sliced off by the leading end of the next adjacent flight section of the screw 11. As a result, the last mentioned flight section mixes and compacts the sliced off plug material to deliver a further plug of mortar material from the trailing end thereof whereupon the mixing procedure just described is repeated by and between the succeeding flight sections of the screw 11 until the mortar material is delivered to the final mixing chamber 23 where the material is subjected to violent agitation and mixing by the beaters 24 before being discharged through the outlet 27 of the chamber 23.

The illustrated tube 10 is built from externally flanged semi-cylindrical sections 29 detachably held together by G-clamps 30. It is to be understood, however, that this tube might be fabricated by other techniques well known to those skilled in the art.

Figure 5:
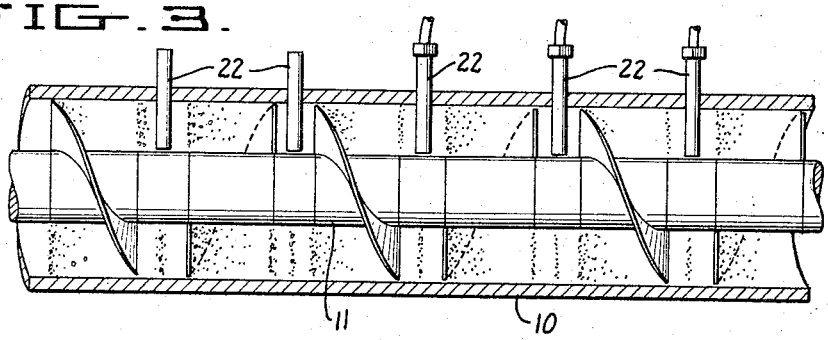
FIG. 5 is a fragmentary view of a portion of FIG. 1 illustrating how the mixing material would appear when mixed within the inventive device.
Figure 6:
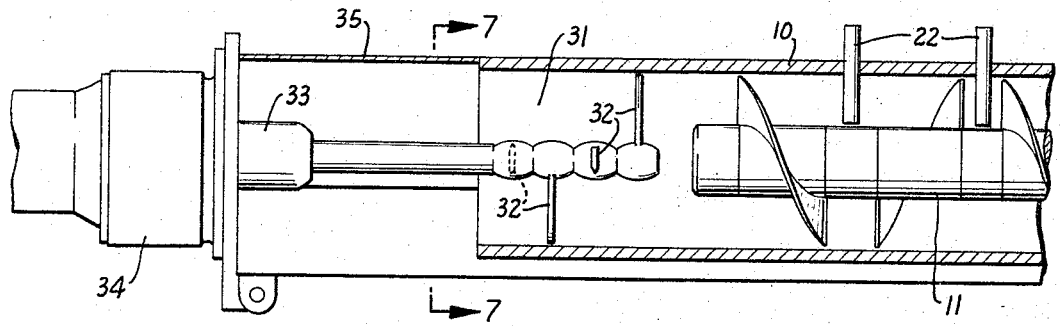
FIG. 6 is a sectional side elevation view of a second embodiment of the invention.
Figure 7:
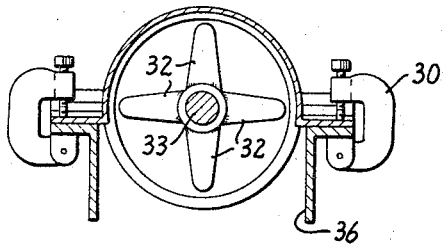
FIG. 7 is a cross-sectional view taken along the plane designated by line 7—7 of FIG. 6.

Referring now to FIGS. 5, 6 and 7, the embodiment illustrated therein differs from the aforedescribed embodiment primarily in that it employs an alternative form of final mixing chamber. Accordingly, only so much of the embodiment employing the alternative form of mixing chamber is illustrated as is necessary to show the structure of the chamber and components cooperating therewith. Like numerals in the respective embodiment of the invention illustrated designate corresponding elements.

The alternative chamber comprises a horizontal extension 31 of the outlet end of the tube 10. In this embodiment the beaters of the final mixer comprise blades 32 radially projecting from a drive shaft 33. The shaft 33 is driven by a motor 34 similar to the motor 26. The motor 34 is supported on an extension cowling secured to the tube 10, which cowling defines in the lower portion thereof a mortar discharging opening 36.

In the illustrated embodiments of the mixer, section 14 is longer than the other flight sections and of continuously varying pitch. Although not apparent from the drawings, it is also preferable to progressively increase the pitch of the interrupted flight sections in step-by-step fashion. Where the pitch is increased in this fashion, it may be desirable to maintain the pitch of the final flight sections 19 to 21 constant. The provision of continuously varying pitch in the initial flight sections facilitates the scavenging of the inner surface of the tube 10.

The number of longitudinally spaced flight sections may be varied according to the particular embodiment desired. Thus, while eight longitudinally spaced flight sections are illustrated in the drawings, any number of spaced flight sections may be utilized within the concept of the invention.

While the invention has been described in specific detail, it should be apparent to those skilled in the art that various changes or modifications in structure can be made without departing from the spirit of the invention.

We claim:
1. A tube type mixer comprising:
  (a) an elongated tubular casing;
  (b) an elongated shaft extending axially through said casing for rotation and against axial movement relative thereto;
  (c) a screw flight fixed to said shaft and extending helically therearound and radially therefrom into proximate contact with said casing, said flight having interruptions therein at longitudinally spaced intervals along said shaft;
  (d) substantially cylindrical spacers coaxially disposed on said shaft at each of said interruptions, said spacers having a length and cross-section permitting, during the conveyance of material by said screw flight, the accumulation of a plug of said material at each of said interruptions, whereby:
    (1) the portions of the screw flight immediately upstream of each of said interruptions function to trowel material onto the trailing end of the plug in the interruption immediately downstream therefrom; and
    (2) the portions of the screw flight immediately downstream of each of said interruptions function to shear material from the leading end of the plug in the interruption immediately upstream therefrom;
  (e) feeding means in communication with the interior of said casing at an upstream portion of said flight, said means being adapted to continuously supply material to be mixed to said flight;
  (f) outlet means in communication with the interior of said casing at a portion of said flight downstream of said feeding means, said outlet means being adapted to permit the discharge of mixed material from said casing;
  (g) a plurality of pins fixed to and extending radially into said casing, respectively, at the interruptions in said flight, said pins having the distal ends thereof disposed immediately adjacent said spacers to prevent the build-up of material being conveyed by said screw flight on said spacers; and,
  (h) means for introducing fluid additives into a material being mixed within said casing.

2. A mixer according to claim 1 wherein said means for introducing fluid additives comprises passage means extending through at least some of said pins through which fluid may be conveyed from the exterior to the interior of said casing.

3. A mixer according to claim 1 wherein the pitch of said flight increases from the upstream to the downstream end thereof over at least part of the length thereof.

4. A tube type mixer comprising:
  (a) an elongated tubular casing;
  (b) an elongated shaft extending axially through said casing for rotation relative thereto;
  (c) a screw flight fixed to said shaft and extending helically therearound and radially therefrom into proximate contact with said casing, said flight having interruptions therein at longitudinally spaced intervals along said shaft;
  (d) substantially cylindrical spacers coaxially disposed on said shaft at each of said interruptions;
  (e) feeding means in communication with the interior of said casing at an upstream portion of said flight, said means being adapted to continuously supply material to be mixed to said flight;
  (f) outlet means in communication with the interior of said casing at a portion of said flight downstream of said feeding means, said outlet means being adapted to permit the discharge of mixed material from said casing;
  (g) a plurality of pins fixed to and extending radially into said casing, respectively, at the interruptions in said flight, said pins having the distal ends thereof disposed immediately adjacent said spacers;
  (h) means for introducing fluid additives into a material being mixed within said casing;
  (i) final mixing chamber having a material inlet disposed in receiving communication with said outlet means and a material outlet disposed in spaced relationship to said inlet; and,
  (j) a rotating beater received in said chamber between the inlet and outlet thereof to effect the beating of material received in said chamber.

5. A mixer according to claim 4, wherein:
  (a) said chamber is of elongated tubular configuration and disposed substantially normal to said casing;
  (b) the inlet of said chamber is disposed intermediate the ends thereof;
  (c) the outlet of said chamber is disposed at one end thereof; and,
  (d) said beater comprises at least one elongated element mounted longitudinally within said chamber for movement in an annular path closely adjacent the longitudinally extending interior surface thereof.

6. A mixer according to claim 5, wherein:

(a) said chamber is cylindrical; and,
(b) said outlet is of less area than the cross-sectional area of said chamber measured on a plane extending normal thereto and is disposed eccentrically of the longitudinal axis of said chamber.
7. A mixer according to claim 4, wherein:
(a) said chamber is of elongated tubular configuration and disposed in substantially coaxial relationship relative to said casing;
(b) the inlet of said chamber is at one end thereof;
(c) the outlet of said chamber is at the other end thereof; and,
(d) said beater comprises a shaft rotatably mounted coaxially within said chamber, said shaft having a plurality of blades fixed thereto and extending radially therefrom into proximate contact with the longitudinally extending interior surface of said chamber.

References Cited

UNITED STATES PATENTS

| | | | |
|---|---|---|---|
| 1,484,945 | 2/1924 | Hill | 259—97 |
| 1,780,067 | 10/1930 | Cox | 259—9 X |
| 3,019,895 | 2/1962 | Loevenstein et al. | 259—9 X |
| 3,253,818 | 5/1966 | Seddon et al. | 259—9 |

FOREIGN PATENTS 1,066,467   10/1959   Germany.

WALTER A. SCHEEL, *Primary Examiner.*
R. JENKINS, *Assistant Examiner.*